United States Patent [19]

Phillips

[11] Patent Number: 4,799,300
[45] Date of Patent: Jan. 24, 1989

[54] APPARATUS FOR SHAVING ELONGATE METAL STOCK

[76] Inventor: Paul M. Phillips, 11844 Rancho Bernardo Rd., Ste. 120-165, San Diego, Calif. 92128

[21] Appl. No.: 27,323

[22] Filed: Mar. 17, 1987

Related U.S. Application Data

[63] Continuation-in-part of Ser. No. 877,314, Jun. 23, 1986, abandoned, which is a continuation of Ser. No. 561,959, Dec. 16, 1983, abandoned, which is a continuation of Ser. No. 273,479, Jun. 15, 1981, abandoned.

[51] Int. Cl.⁴ .................... B23P 17/02; B23D 1/20
[52] U.S. Cl. .................... 29/33 F; 72/275; 409/298
[58] Field of Search .......... 29/33 F, 33 R, 557, 29/561, 564, 547; 409/310, 308, 319, 329, 300, 301, 293, 298, 289, 345, 347, 138; 72/275, 284, 285, 45; 83/914

[56] References Cited

U.S. PATENT DOCUMENTS

| | | | |
|---|---|---|---|
| 1,163,062 | 12/1915 | Belz et al. .................... | 72/275 |
| 1,970,016 | 8/1934 | Morton .................... | 409/345 X |
| 2,086,104 | 10/1936 | Wensley .................... | 29/564 |
| 2,260,773 | 11/1937 | Cook .................... | 29/33 F |
| 2,309,218 | 4/1941 | Schwinn .................... | 409/300 |
| 2,619,881 | 12/1952 | Dudley .................... | 409/298 |
| 2,638,818 | 5/1953 | Stevens .................... | 409/310 |
| 2,703,512 | 3/1955 | Brookes et al. .................... | 409/345 X |
| 3,049,058 | 8/1962 | Sadtler .................... | 90/24 |
| 3,055,102 | 9/1962 | Shaw et al. .................... | 29/547 |
| 3,132,564 | 5/1964 | Lindemann .................... | 90/24 |
| 3,157,093 | 11/1964 | Shaw et al. .................... | 90/24 |
| 3,400,451 | 9/1968 | Pierce .................... | 29/561 |
| 3,430,477 | 3/1969 | Breyer .................... | 72/275 |
| 3,557,588 | 1/1971 | Catlin et al. .................... | 72/45 |
| 3,700,488 | 9/1973 | Cucuz et al. .................... | 409/298 |
| 3,911,541 | 10/1975 | Ziemek et al. .................... | 29/33 |
| 3,935,723 | 2/1976 | Fieldsend et al. .................... | 72/275 |
| 4,165,625 | 8/1979 | Wagner et al. .................... | 409/298 |
| 4,197,043 | 4/1980 | Houghton .................... | 409/138 |

FOREIGN PATENT DOCUMENTS

| | | | |
|---|---|---|---|
| 257103 | 5/1963 | Australia .................... | 409/298 |
| 112593 | 10/1978 | Japan .................... | 409/301 |
| 120918 | 9/1980 | Japan .................... | 409/298 |
| 114618 | 9/1981 | Japan .................... | 409/298 |
| 171515 | 10/1982 | Japan .................... | 72/275 |
| 757265 | 8/1980 | U.S.S.R. .................... | 409/303 |
| 649196 | 2/1981 | U.S.S.R. .................... | 409/298 |
| 1456011 | 11/1976 | United Kingdom .................... | 409/303 |

Primary Examiner—William R. Briggs
Attorney, Agent, or Firm—Renner, Otto, Boisselle & Sklar

[57] ABSTRACT

An apparatus and method for shaving elongate metal stock such as rod, wire and the like, characterized by the employment of a plurality of progressive die stations each including diametrically opposed segmental dies which are automatically indexed to remove surface imperfections from metal stock, to impart desired cross-sectional shapes to the metal stock and/or to impart desired tapered profiles to the metal stock. The segmental dies at each station are rigidly secured to respective carriages by heel and toe clamps and the carriages are radially advanced and retracted in rigid restraints by hydraulic actuators provided with adjustable mechanical stops which limit inward carriage adavancement. The carriages and hydraulic actuators for each station are mounted on a mounting plate which is securable to an upright support plate at any one of a member of rotated positions. The support plates are fixed at their lower ends to a base structure and tied at their upper ends to adjacent support plates as well as the base structure to eliminate or minimize chatter as the metal stock is continuously advanced through the progressive die stations.

17 Claims, 4 Drawing Sheets

APPARATUS FOR SHAVING ELONGATE METAL STOCK

This application is a continuation-in-part of applicant's copending application Ser. No. 877,314, filed June 23, 1986, entitled "Metal Cutting Apparatus And Method", abandoned, which is a continuation of application Ser. No. 561,959 filed Dec. 16, 1983, entitled "Metal Cutting Apparatus And Method", abandoned, which is a continuation of application Ser. No. 273,479, filed June 15, 1981, entitled "Metal Cutting Apparatus And Method", abandoned. Accordingly, the present invention relates to the cold finishing of elongate metal stock such as rod, wire or the like and, more particularly, to an apparatus and method for effecting the removal of surface metal from continuously advanced metal stock.

BACKGROUND

In many instances it is desirable to remove unwanted surface metal from wire, rod and like elongate metal stock prior to further processing. This might be done, for example, to convert "scrap" stock into a high quality material suitable for use in many applications. Other reasons are to shape the stock for subsequent machining or use in straight cut lengths, or to provide dimensionally accurate rod or wire for cold heading, closed die forming, machining and spring making operations.

Heretofore various techniques have been employed to effect removal of surface material from wire and rods. Some of these techniques have involved the use of shaving tools or dies which cut or peel unwanted surface material from the metal stock as it is advanced by or through the shaving tool or die. For example, round dies have been used in cold or hot finishing operations to effect a reduction in the cross-sectional area of the metal stock being drawn therethrough. The use of such dies, however, has several disadvantages including their relatively high cost and the inability to be reshaped without increasing the die diameter.

Other shaving techniques involve the removal of metal in a series of stages spaced axially along the path of the stock and at differing angles about the stock, each stage accomplishing removal of surface metal from a corresponding side of the metal stock. Two proposed techniques of this nature are described in U.S. Pat. Nos. 2,638,818 and 2,703,512. In the former, the cutting elements at each stage are mounted on extension arms and posts which yieldingly urge the cutting elements together with or without assistance of springs. In the latter, each cutting element is mounted in a tool holder along with a back-up roll which loads the material stock against the cutting element.

Notwithstanding the many shaving or cutting techniques proposed in the past, none have been found to be entirely adequate. One difficulty has been chattering, such being evidenced by surface roughness of the metal stock and rapid wear of the cutting tool. Another drawback has been the inability to achieve high operational speeds such as on the order of 500 ft. per minute or higher with acceptable results. Still other drawbacks have been the inability to provide for selective removal of only defective surface material and a general lack of flexibility with respect to the shape or profile imparted to the metal stock.

SUMMARY OF THE INVENTION

According to the invention, an apparatus and method for shaving elongate metal stock such as rod, wire and the like is characterized by a plurality of progressive die stations each including diametrically opposed segmental dies which are automatically indexed to remove surface imperfections from metal stock, to impart desired cross-sectional shapes to the metal stock and/or to impart desired taper profiles to the metal stock. The segmental dies at each station are rigidly secured to respective carriages by heel and toe clamps and the carriages are radially advanced and retracted in rigid restraints by hydraulic actuators provided with adjustable mechanical stops which operate to limit inward carriage advancement. The carriages and hydraulic actuators for each station are mounted on a mounting plate which is securable to an upright support plate in any one of a number of rotated positions. The support plates are fixed at their lower ends to a base structure and tied together at their upper ends to adjacent support plates to eliminate or minimize chatter as the metal stock is continuously advanced through the progressive die stations.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Applicant's above identified copending application Ser. No. 877,314 is hereby fully incorporated herein by reference. The present invention embodies improvements to the apparatus and method disclosed in such copending application.

Figure 1:
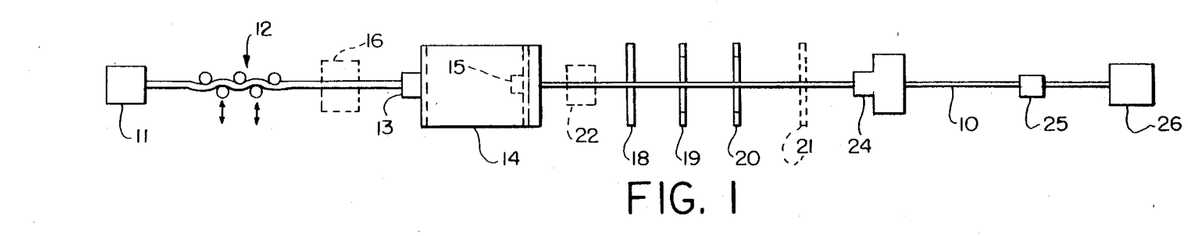
FIG. 1 is a schematic plan view of a shaving apparatus according to the invention.

Referring now in detail to the drawings, the schematic diagram of FIG. 1 generally illustrates the apparatus and method of the invention for imparting a desired surface finish, cross-section and/or profile to metal stock such as rod, wire and the like. As shown, the metal stock 10 taken from a spool or other supply 11 is first passed through a straightener 12 and then through a guide die 13 into a lubricant or "soap" box 14. The lubricant box 14 serves to coat the metal stock with lubricant before passage through a preshaping die 15 at the exit opening of the box. If desired, the metal stock may be passed through an optional sand blasting chamber indicated at 16 for removal of loose scale, rust, etc. from the metal stock before passage through the lubricant box 14 and preshaping die 15.

The preshaping die 15 forms the metal stock 10 to a desired cross-section before passage through a plurality of progressive die stations 18–20 which are operated to shave surface metal from the metal stock. Depending on the application, such die stations may serve to effect removal of surface imperfections from the metal stock, to impart a desired cross-section to the metal stock and/or to impart a desired profile to the metal stock. As shown, three die stations may be provided, such constituting a desired number for most applications. However, four or more stations may be employed depending on the particular application, there being an optional fourth station shown in broken lines at 21. In one particular application discussed below, an optional flaw detector shown in phantom lines at 22 may be provided between the preshaping die 15 and the first die station 18.

After passage through the die stations 18–20, the metal stock then passes through a guide 24 and then through a forming die 25 in some applications before passage to a take-up device 26 or further processing line for the metal stock. The die 25 may be utilized for example to give the metal stock its final shape at the exit end of the apparatus. The take-up device 26 may be in the form of a rotatably driven "pull-block", although any suitable means may be employed to pull the metal stock through the apparatus at a desired processing speed.

Figure 2:
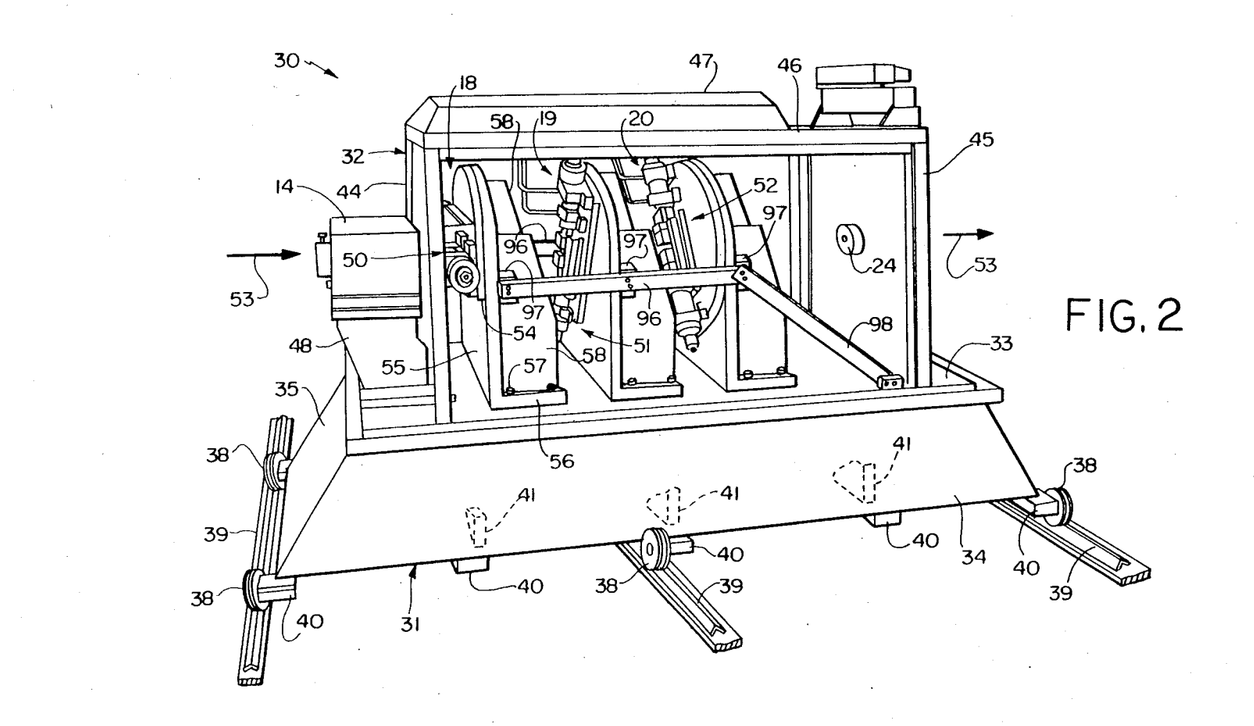
FIG. 2 is a perspective view of a major intermediate assembly of the overall apparatus employing three progressive die stations.

As seen in FIG. 2, the major intermediate components of the apparatus are provided in an assembly indicated generally by reference numeral 30. The assembly 30 comprises a box-like base or stand 31 and a superstructure 32. The base 31 has a large rectangular platform plate 33 horizontally supported adjacent each side edge atop a vertical trapezoidal side plate 34. Also, the platform plate 33 is supported adjacent its end edges atop inclined rectangular end plates 35 which are secured between and to the inclined edges of the side plates 34.

The base 31 may be supported by grooved wheels 38 on parallel tracks 39 for transverse movement. This is desirable for shuttling of the apparatus into and out of alignment with one or more processing lines as may be desired. As shown, the rollers 38 are rotatably mounted to the ends of selected transversely extending tie plates 40 secured between and to the side plates 34 at their lower edges. The tie plates 40 are spaced along the length of the base and may support thereon respective vertical bracing plates 41 which in turn support the platform plate 33 at locations intermediate its ends to provide a rigid support for components mounted thereon.

The superstructure 32 includes two transversely extending upright plates 44 and 45 fixedly secured at their lower edges to and adjacent opposite ends of the platform plate 33. At their upper edges, the upright plates 44 and 45 have secured thereto respective ends of a horizontal cover plate 46. The cover plate 46 may be provided with a central opening therein and have mounted thereon a light fixture 47 for illuminating the interior space of the superstructure which contains the progressive die stations 18–20 which are more fully described below. The superstructure 32 also provides a convenient mount for the lubricating box 14 at the upright plate 44 and the guide 24 at the upright plate 45.

The lubricating box 14 also may be supported at its bottom side by a gusset 48 which in turn is supported atop the platform plate 33 forwardly of the upright plate 44.

Each progressive die station 18–20 includes a respective segmental die mechanism 50–52. The segmental die mechanisms are essentially identical and differ only in their mounted orientation relative to the path of the metal stock therethrough, such path being illustrated by the arrows 53. Accordingly, only the segmental die mechanism 50 associated with the upstream station 18 will be described in further detail, it being appreciated that such description is equally applicable to the segmental die mechanisms 51 and 52 of the other stations 19 and 20.

Figure 3:
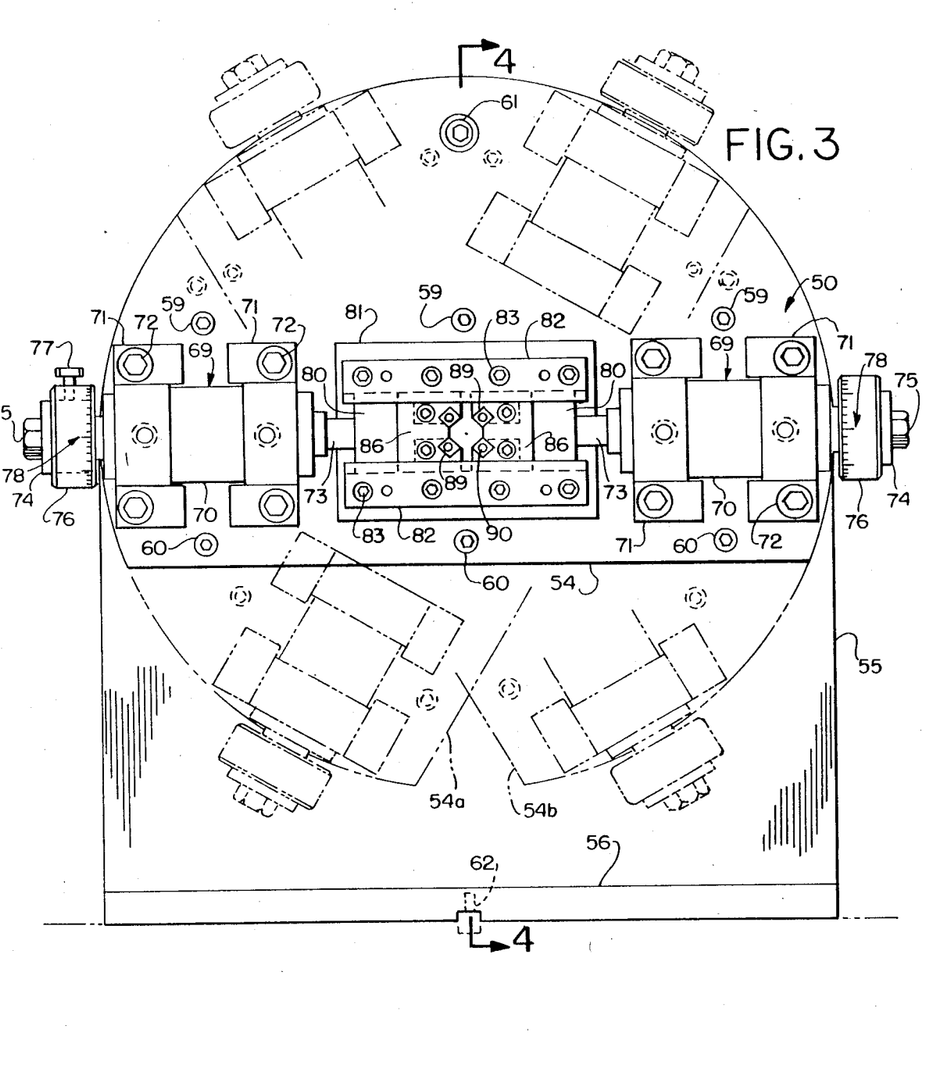
FIG. 3 is a transverse plan view of an illustrative one of the progressive die stations.
Figure 4:
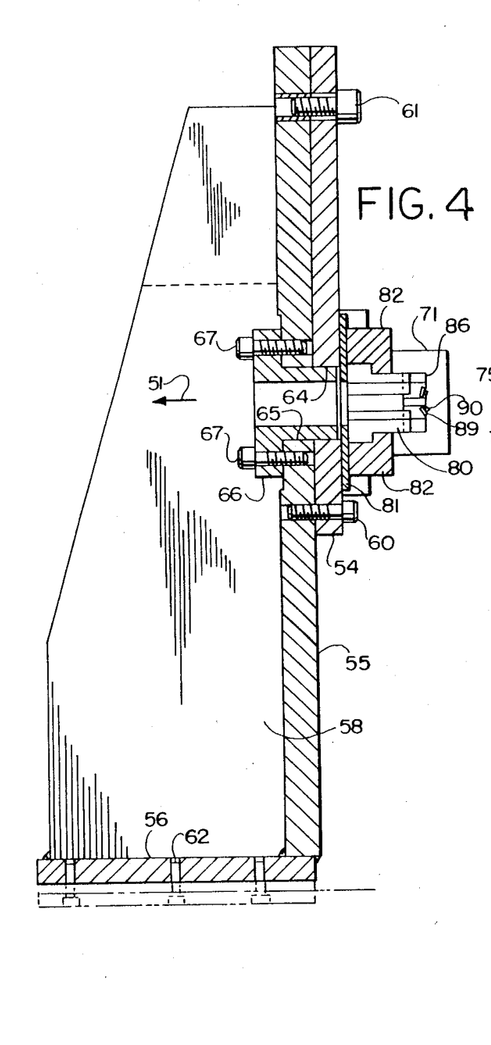
FIG. 4 is a vertical section through the die station of FIG. 3 taken substantially along the line 4—4 thereof.

With additional reference to FIGS. 3 and 4, the segmental die mechanism 50 is mounted by means of a mounting plate 54 to an upright support plate or stanchion 55 having a footer 56 secured atop the platform plate 33 by fasteners 57. At its downstream side opposite the mounting plate 54, the upright support plate 55 is rigidly backed by a pair of transversely spaced, vertical gussets 58 which serve to prevent oscillation of the support plate 55 at right angles to its planar extent. As best seen in FIG. 3, the support plate 55 has a circular top edge coinciding in radius with the mounting plate 54 which has the shape of a truncated circle. The mounting plate, with its bottom edge extending horizontally, is secured to the support plate 55 by two sets of fasteners 59 and 60, each set of fasteners being located along respective chords of the mounting plate in symmetrical relation to the fasteners located along the chord of the other set. The mounting plate further may be secured to the support plate by another fastener 61 located on the center radius of the mounting plate. As also seen in FIGS. 3 and 4, the support plate 55 is precisely located on the platform plate by locating pins 62. It also is noted that the support plate may be provided with strategically placed holes for securement of the mounting plate at other positions rotatably offset about the path of the metal stock as illustrated by phantom lines.

The mounting plate 54 and support plate 55 have at their centers respective aligned openings 64 and 65 concentric with the path of the metal stock indicated by the arrow 51. Received in such openings 64 and 65 is a tubular alignment guide 66 secured at an annular flange to the downstream side of the support plate by fasteners 67. The tubular alignment guide 66 has an inner diameter substantially greater than the metal stock to be processed for free passage of the metal stock along the path 51.

As best seen in FIG. 3, the segmental die mechanism 50 comprises a pair of diametrically opposed, large piston-cylinder assemblies 69 which hereinafter are referred to as shaving die actuators. The cylinder 70 of each actuator 69 is rigidly secured by a pair of mounting blocks 71 to the mounting plate 54 by fasteners 72. Each actuator is of double-ended type having a piston rod 73 projecting from opposite ends of the cylinder 70. At its radially outer projecting end, the piston rod 73 has secured thereto an adjustment collar hub 74 by a fastener 75. The hub 74 is externally threaded for threaded receipt of an adjustment collar 76 which is operable to abut the adjacent end of the cylinder 70 to limit radially inward movement of the piston rod 73. The extent of inward movement of the piston rod may be easily adjusted by rotating the collar on the hub. Once adjusted as desired, the collar may be fixed in place by a set screw 77. The collar also may be provided with a gradient as seen at 78 to facilitate adjustment.

At its radially inner end, the piston rod 73 of each actuator 69 is connected to a respective carriage block 80. The carriage blocks 80 are rigidly constrained for radial movement on a slide plate 81 by parallel guide blocks 82. The guide blocks 82 are fixedly secured to the mounting plate 54 by fasteners 83 with the slide plate 81 being clamped flush to the mounting plate 54 by such guide blocks as illustrated. As best seen in FIG. 4, the guide blocks 82 are undercut at their inner sides for receipt of corresponding side flanges on each carriage block. As should now be apparent, extension and retraction of the actuators 69 will move the carriage blocks 80 radially inwardly towards and away from the path 51 of the metal stock with the extent of radially inward movement being precisely determined by the adjustment collars 76.

Each carriage block 80 is provided at its upstream side opposite the mounting plate 54 with a T-shape slot for close mating receipt of the correspondingly T-shape underside of a tool holder 86, the slot and tool holder underside being outlined by broken lines in FIG. 3. In this manner, the tool holder is locked to the carriage block when secured thereto by fasteners. As further seen in FIG. 3, the radially extending stem of the T-shape groove may terminate at a line axially coinciding with the bottom facet of a three sided groove provided in the radially inner face of the tool holder. The sides or facets of the groove are configured to form three sides of an octagonal shape.

At right angles to the side facets of the groove in each tool holder 86, there are provided respective recesses or insets in the upstream side of each tool holder which are sized and shaped to closely accommodate carbide shaving dies 89. Each die is secured in the respective recess by a fastener 90 with a straight cutting edge extending inwardly beyond and parallel to the respective side facet of the groove. Consequently, the dies are located at next adjacent side of an octagon. Also, the bottoms of the recesses and consequently the dies secured flush therewith may be canted to a plane normal to the path of the metal stock to provide a positive or preferably a negative rake. A preferred negative rake angle is 5°.

The exemplary die arrangement seen in FIGS. 3 and 4 is particularly suitable for shaving rod which has been preformed by the preforming die to a twelve-sided (duo decimagon) cross-sectional shape. Consequently, the dies when radially inwardly indexed as seen in FIG. 3 operate to remove surface metal from respective facets of the metal stock. As discussed below, the dies in the segmental die mechanisms in the progressive die stations may be circumferentially offset at 60° angles whereby surface metal is removed from each facet of the metal stock. As will be appreciated, round or otherwise shaped stock also may be passed through the progressive die stations for imparting thereto a twelve-sided cross-sectional shape that may be readily reformed, for example, to a circular shape if desired.

Although not shown, there may be provided at the segmental die mechanism suitable means for applying lubricant-coolant to the metal stock just upstream of the shaving die elements to facilitate the cutting operation. Also, chip breakers may be provided.

As previously indicated, the segmental die mechanisms 51 and 52 in the downstream progressive die stations 19 and 20 are identical to the just described segmental die mechanism 50 in the upstream die station 18. However, such segmental die mechanisms 51 and 52 are circumferentially offset at opposite 60° angles to the segmental die mechanism 50 at the upstream die station as seen in FIG. 2 and also illustrated by the phantom line positions thereof in FIG. 3. In each case, the segmental die mechanisms are mounted in like manner to their respective mounting plates, but each mounting plate is secured to the corresponding support plate at the desired rotated orientation about the path of the metal stock. As illustrated in FIG. 3, the mounting plate 54a at the intermediate station is counterclockwise offset 60° relative to the mounting plate 54 in the upstream die station whereas the mounting plate 54b at the downstream die station is clockwise offset 60°. Consequently, the segmental die mechanisms each operate to shave respective four sides of metal stock having a twelve sided (duo decimagon) cross-sectional shape.

The above described shaving apparatus may be operated by suitable controls to remove surface material from metal stock. Initially, the metal stock is threaded through the apparatus as previously indicated for connection to suitable take-up means 26 which operates to pull the metal stock through the apparatus at a desired processing speed. As the metal stock is drawn through the apparatus, the shaving die actuators 69 at each progressive die station 18, 19, 20 then may be operated automatically to index the shaving dies 89 into the path of the metal stock for removing surface metal from respective sides of the metal stock. Of course, the adjustment collars 76 will already have been adjusted to provide the desired depth of cut being made by the shaving dies.

In the illustrated embodiment, the metal stock as it passes through each segmental die mechanism 50, 51, 52 is rigidly loaded against the shaving dies 89 in each tool holder by respective diametrically opposed shaving dies in the other tool holder. Moreover, the shaving dies are rigidly held against both radially inward and outward movement by high cylinder pressure forces of the shaving die actuators 69 which serve to hold the adjustment collars 76 butted against the cylinders 70. Consequently, the shaving dies are firmly held against oscillatory movement which may otherwise occur in response to variations in encountered resistance as may result by reason of irregular surface defects on the metal stock. If the shaving dies were not rigidly restrained and held against such oscillatory movement, chattering or vibration could result particularly when shallow surface cuts are being made. In this regard, it further is noted that the tool holders and associated components are of heavy duty construction and type for rigid restraint and firm holding of the shaving dies during the shaving operation.

In order to minimize any vibratory movement of the segmental die mechanisms 50-52 longitudinally with respect to the metal stock during the cutting operation, the support plates 55 therefor are rigidly tied together at common elevation with the segmental die mechanisms by tie bars 96 as seen in FIG. 2. The tie bars are secured to mounting blocks 97 fixed to the support plates at respective common sides of the support plates. Also provided at each side of the assembly are inclined tie bars 98 secured between respective tie bars and the platform plate 33 as illustrated. Of course, the lower ends of the support plates are rigidly tied together by way of their securement to the platform plate.

The foregoing die arrangement and operational procedure is merely representative of one of the many ways in which the apparatus may be utilized. Different segmental shaving dies may be employed and mounted in properly configured tool holders for imparting a different cross-sectional shape to the metal stock than that indicated such as round, polygonal and non-round cross-sections for any given application. Also, the number of progressive die stations may be varied as needed.

In addition, other forms of shaving die actuators may be utilized in place of the hydraulic actuators for effecting automatic indexing of the shaving dies. For example, a screw and gear drive may be provided and powered by a reversible electric motor. In order to prevent undesirable vibration of the shaving dies, the drive components should be of no backlash type.

An electric motor driven screw and gear drive would be particularly useful in another application of the apparatus for obtaining precisely controlled movement of the shaving dies as they are progressively indexed into and out of the path of the metal stock for purposes of imparting a desired taper thereto. That is, a continuous length of metal stock may be provided with a multiplicity of tapers over given lengths thereof by moving the shaving dies gradually radially into and out of the metal stock as a function of the linear rate of the metal stock moving through the apparatus. This could provide, for example, surface improved rod for automotive constant rate suspension spring applications. It perhaps should be further noted that provision of the requisite controls is well within the realm of conventional machine control design.

The apparatus also may be operated to effect selective removal of surface defects or imperfections from the metal stock by utilizing the aforementioned flaw detector 22. The flaw detector may be of any suitable type capable of identifying surface defects and generating control signals upon detection of a defect for effecting responsive actuation of the shaving dies as the flawed area of the metal stock passes through the segmental die mechanisms. Consequently, only the flawed surface portions of the metal stock would be removed. One type of flaw detector which may be utilized is sold by Magnetic Analysis Corporation under the designation type 6RT Indicator and Control Unit. The output of such device may be utilized as an input to circuitry which controls operation of the shaving die actuators. Again, the design of the requisite circuitry is well within the realm of conventional machine control design.

Figure 5:
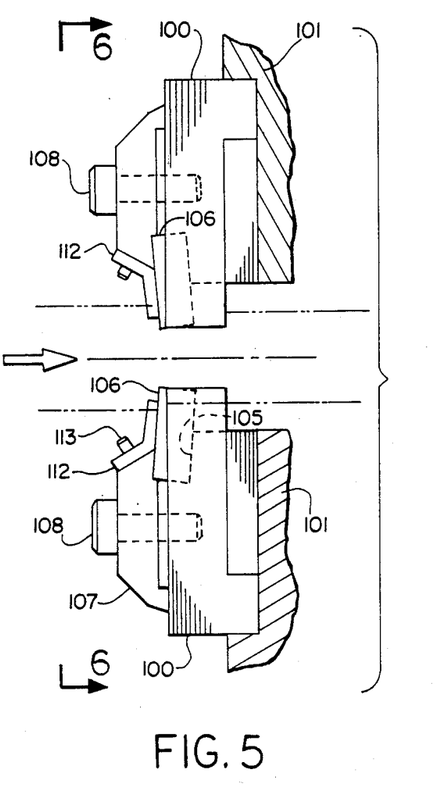
FIG. 5 is a transverse plan view showing preferred segmental shaving dies and mounts therefor.
Figure 6:
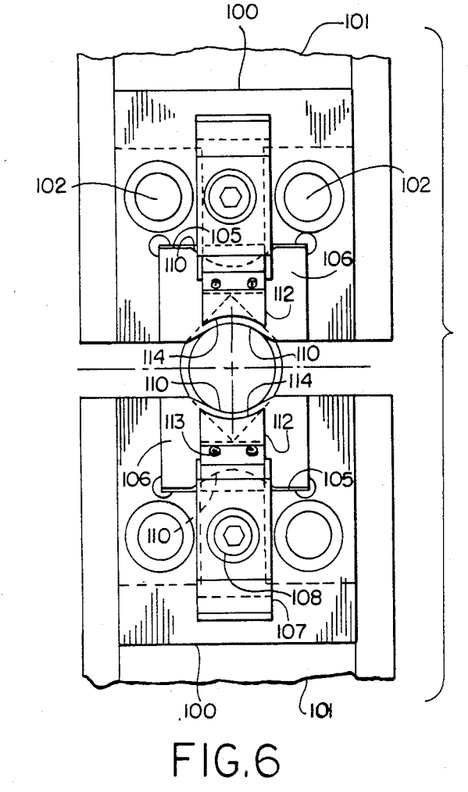
FIG. 6 is an axial plan view of the shaving dies and mounts of FIG. 5 as seen from the line 6—6 thereof.

Referring now to FIGS. 5 and 6, another form of tool holder and carbide shaving die arrangement is illustrated. Like before, the tool holder 100 has a T-shape underside which fits in a T-shape slot provided in the carriage block 101 at its upstream side, each tool holder being secured to the respective carriage block by a pair of fasteners 102. The tool holders and associated components are identical but diametrically opposed as illustrated.

At their upstream sides adjacent their radially inner ends, the tool holders 100 each are provided with a rectangular-shape recess or inset 105 for receipt of a carbide segmental shaving die 106. The die located in the recess is securely clamped to the tool holder at the slightly inwardly recessed toe of a heel and toe plate 107 secured to the tool holder by a fastener 108. At its heel, the heel and toe plate is forcibly pivoted by the fastener to provide high clamping forces holding the die securely in place and against vibration relative to the tool holder. Preferably, the recess 105 is slightly canted to the path of the metal stock to provide a negative rake to the shaving die preferably at an angle of about 5°.

Each shaving die 106 is provided as by grinding with an arcuate groove 110 at opposite radial faces thereof, the arc of each groove being struck about respective axes extending perpendicular to the planar faces of the shaving die. Each groove preferably is precision ground to form arcuate cutting edges at the intersection of each groove with adjacent respective faces of the shaving die. Consequently, four cutting edges are provided. When one cutting edge becomes worn, one of the other cutting edges may be utilized by either reversing the shaving die and/or turning the shaving die over. Accordingly, the shaving die need not be replaced or reground until all four cutting edges thereon have become worn.

In those applications employing three progressive die stations having segmental die mechanisms rotated at 60° intervals, the radius and length of the shaving die cutting edges usually would be selected to provide a cut over 60° of the metal stock surface when indexed into the path of the metal stock. Consequently, the shaving dies collectively would provide full surface shaving of the metal stock. As a general rule, the shaving dies may have an arcuate cutting length obtained by dividing the number of progressive die stations into 360°. Of course, the segmental die mechanisms in the die stations would be circumferentially offset at corresponding angular intervals to obtain 360° cutting action.

As also seen in FIGS. 5 and 6, a chip breaker 112 may be and desirably is provided at each shaving die 106. The chip breaker has angularly disposed radially inner and outer end portions, the radially outer end portion being secured to an inclined face of the heel and toe plate 107 by fasteners 113. The angle between the portions of the chip breaker coincides with the angle formed between the radially inner face of the heel and toe plate 107 and the upstream face of the shaving die whereby the fastener holds the chip breaker tightly clamped against such radially inner end face and upstream face. As seen in FIG. 6, the chip breaker may have an arcuate radially inner face 114 against which chips removed from the metal stock by the shaving die are broken to prevent long chip streamers. Long chip streamers are to be avoided since their accumulation at the die may require shutting down the machine to effect their removal.

Figure 7:
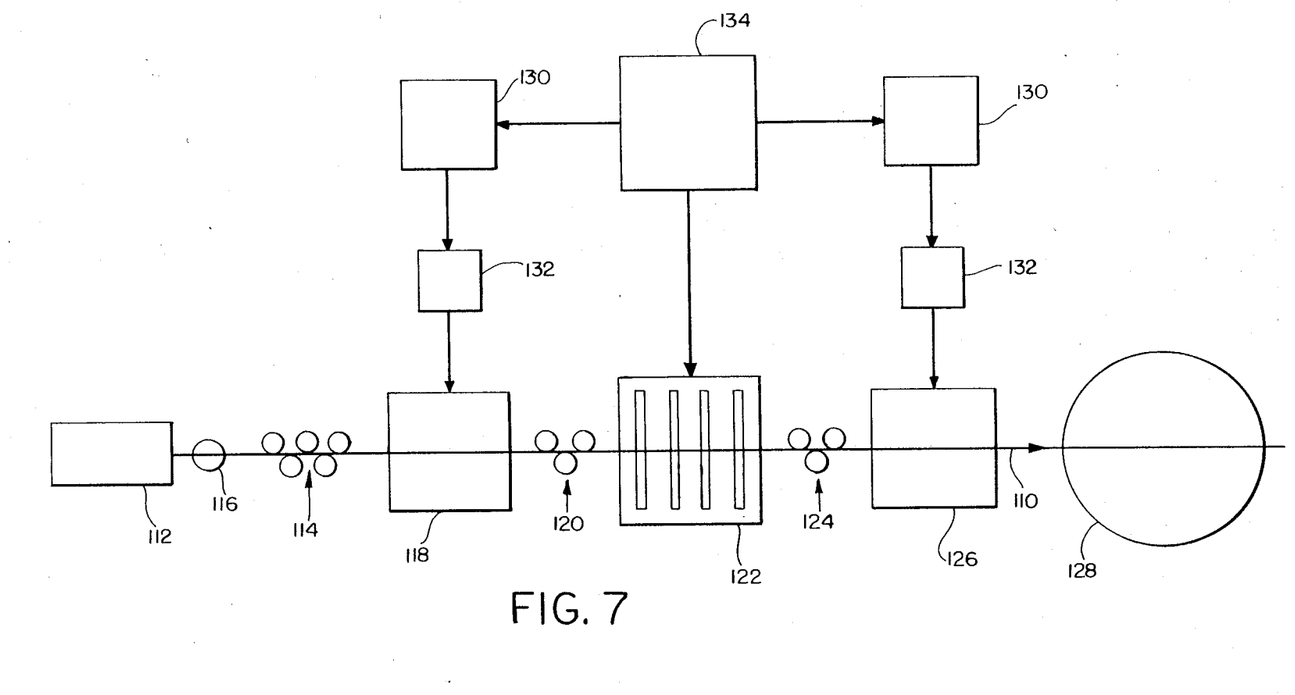
FIG. 7 is a schematic plan view of another embodiment of a shaving apparatus according to the invention.

Referring now to FIG. 7 there is illustrated in schematic an additional embodiment of a shaving apparatus according to the invention for imparting a desired surface finish, cross-section and/or profile to metal stock such as rod, wire and the like. As shown, the metal stock 110 taken from a spool, pay-off reel, or other supply 112 is first passed through a straightener 114. Located ahead of the straightener 114 is a snarl switch 116 to shut down the apparatus if a snarl develops in the metal stock 110. After the straightener 114, the metal stock 110 passes through a descaling chamber 118. Preferably, chamber 118 includes a plurality of nozzles which impact the surface of the metal stock 110 with abrasive particles in a water jet at a pressure of at least about 10,000 psi to remove scale, texturize, and remove up to 0.006" of metal from the surface of the metal stock 110. After chamber 118, the metal stock 110 passes through rollers 120 which align and stabilize the metal stock 110. The metal stock 110 then passes through a plurality of progressive die stations 122 like that discussed above in connection with FIG. 1. After passage through die stations 122, the metal stock 110 then passes through another set of aligning and stabilizing rollers 124 and another descaling chamber 126. The metal stock is then fed to a take-up device 128 which may be in the form of a rotatably driven "pull block", although any suitable means may be employed to pull the metal stock 110 through the apparatus at a desired processing speed.

The descaling chambers 118 and 126 are preferably fed by a hydraulic piston pump 130 capable of developing about 40,000 to 150,000 psi water pressure at about 3 to 5 gallons per minute flow rate. The outflow from pump 130 is directed to an abrasive grit particle hopper 132 to supply abrasive particles into the high pressure water stream. Preferably, the particle size of the grit is from about 40 to about 150 mesh. A hydraulic pump 134 is provided to drive the pumps 130. As shown, hydraulic pump 134 may also be utilized as a source of hydraulic power to supply the hydraulic needs of the die stations 122.

It should now be apparent that the invention provides a highly desirable apparatus and method for removing surface metal from metal stock such as rod, wire, etc. Such removal may be effected, for example, at depths of 0.001 to 0.375 inch depth in a single pass through the apparatus at speeds even as high as 1800 linear feet per minute. The machine is capable of forming longitudinal tapers on the metal stock as well as desired transverse of cross-sectional shapes. Among the various advantages afforded by the present invention are: the ability to shave numerous flats on metal stock for subsequent drawing back to round stock or otherwise shaped material; removal of scale or the like from wire or rod thereby to eliminate the need for acid pickling baths and/or mechanical descalers; shaving of wire or rod to remove deep surface imperfections such as seams, laps and decarborization zones; selective shaving of imperfections from wire or rod surfaces in response to detection by a flaw detector placed upstream of the progressive die stations; and continuous shaving of wire or rod from coil to coil.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

I claim:

1. In an apparatus for shaving elongate metal stock such as rod, wire or the like, a plurality of radially variable segmental die assemblies through which the metal stock is longitudinally continuously passed, said die assemblies being axially spaced along the path of the metal stock and each comprising a support therefor, diametrically opposed carriages mounted on said support for radial movement toward and away from the path of the metal stock, diametrically opposed segmental shaving dies respectively secured to said carriages for common movement therewith out of and into the path of the metal stock for removing surface metal from diametrically opposed sides of the metal stock, and reciprocating drive means for moving said carriages radially inwardly and outwardly, each segmental die assembly including adjustable mechanical stop means for limiting radially inward movement of said carriages and hence the segmental dies, said reciprocating drive means including a piston-cylinder assembly connected to each carriage for effecting radially inward and outward movement of the carriage; said adjustable mechanical stop means including a stop collar on the piston of each piston-cylinder assembly and an abutment fixed in relation to the cylinder, and said abutment being in the path of said stop collar to limit the radially inward stroke of the piston-cylinder assembly.

2. An apparatus as set forth in claim 1, wherein the carriages are rigidly restrained for radial movement by a pair of parallel guide blocks fixed to a mounting plate.

3. An apparatus as set forth in claim 2, wherein each carriage slides on a bearing plate clamped flush to the mounting plate.

4. An apparatus as set forth in claim 1, wherein said support for each assembly includes a support plate perpendicular to the path of the metal stock.

5. An apparatus as set forth in claim 4, including means for fixing each support plate to an adjacent support plate against relative movement in the direction of the metal stock's path.

6. An apparatus as set forth in claim 5, wherein the support plates are mounted at their bottom edges to a base, and said means for tying includes tie bars secured to opposite sides of the support plates at the attitude of the assemblies mounted thereon.

7. An apparatus as set forth in claim 4, wherein the die assemblies are substantially identical in construction and secured to respective mounting plates, and further including means for securing the mounting plates to respective support plates at any one of a plurality of rotated offset positions.

8. An apparatus as set forth in claim 1, wherein said carriages are controllably indexed inwardly and outwardly in repetitive manner to provide the metal stock with a multiplicity of tapers over given lengths thereof.

9. An apparatus as set forth in claim 1, wherein said assemblies have their respective segmental dies circumferentially offset at respective multiples of an angle obtained by dividing 360° by the number of such die assemblies to obtain full 360° cutting action.

10. An apparatus as set forth in claim 9, wherein said segmental dies each have an arcuate cutting edge having an arcuate cutting length equal to said angle.

11. An apparatus as set forth in claim 1, wherein said drive means is operative to drive said carriages radially to respective set points and then hold said carriages at such set points against both inner and outer radial movement.

12. An apparatus as set forth in claim 1, wherein each die is secured to the carriage by a heel and toe clamp.

13. An apparatus as set forth in claim 12, including a chip breaker secured to each heel and toe clamp adjacent an outer surface of the respective die.

14. In an apparatus for shaving elongate metal stock such as rod, wire or the like, a plurality of radially variable segmental die assemblies through which the metal stock is longitudinally continuously passed, said die assemblies being axially spaced along the path of the metal stock and each comprising a support therefor, diametrically opposed carriages mounted on said support for radial movement toward and away from the path of the metal stock, diametrically opposed segmental shaving dies respectively secured to said carriages for common movement therewith out of and into the path of the metal stock for removing surface metal from diametrically opposed sides of the metal stock, and reciprocating drive means for moving said carriages radially inwardly and outwardly, each segmental shaving die being formed from a block of die material which is symmetrically grooved at opposite ends thereof to provide a pair of cutting edges at each end, and each carriage including means for mounting the block at any one of a number of positions respectively presenting a different one of the cutting edges to the metal stock.

15. An apparatus as set forth in claim 14, wherein said means for mounting includes means for positioning the blocks at a rake angle to the path of the metal stock.

16. An apparatus as set forth in claim 14, wherein said stop collar is adjustable along the length of the piston.

17. An apparatus as set forth in claim 16, wherein the piston extends from each end of the cylinder, the piston being connected at one end to the carriage and the collar being mounted on the other, and the abutment being formed by the end of the cylinder.

* * * * *